June 8, 1954   G. C. AHIER ET AL   2,680,469
METHOD AND APPARATUS FOR MANUFACTURING CARPETS
Filed Oct. 17, 1950   9 Sheets-Sheet 9

INVENTOR.
Georges-Charles Ahier &
Hans Krull
BY Burgess + Pinkhege
Attorneys

Patented June 8, 1954

2,680,469

UNITED STATES PATENT OFFICE 2,680,469

METHOD AND APPARATUS FOR MANUFACTURING CARPETS

George Charles Ahier, Montmorency, France, and Hans Krull, Neumunster, Germany, assignors, by direct and mesne assignments, to George Charles Ahier, Montmorency, Alfred Valentin Champagnat, Paris, and Jean Fernand Maurice Tirmont, Paris, France Application October 17, 1950, Serial No. 190,476

39 Claims. (Cl. 154—1.1)

This invention relates to new and useful improvements in carpet manufacture.

The invention particularly concerns a device for the manufacture of carpets and especially semi-finished products required in carpet manufacturing operation, such as the so-called chenille furs. These chenille furs essentially consist of a warp chain, i. e., warp threads, having a thereto vertically arranged pile or tufting of weft threads, the so-composed chenille furs or strips being secured in closely spaced relation upon a suitable base.

The invention is addressed in particular to a device for the practice of a method for the manufacture of carpets and similar fabrics of the chenille type having a warp chain with vertically arranged cut pile or tufting weft threads. In accordance with this method, the chenille strips, i. e., the chenille fur, is not made by weaving or knitting, but rather by the cementing or bonding of the weft threads in practically right-angular arrangement to and upon the continuously moving warp threads. The weft tufting or pile which is thusly arranged or provided upon the warp or chain threads is then lifted to thereby obtain the chenille fur, the latter being thereupon arranged in closely-placed-together strips upon a suitable base by the simple expedient of cementing the strip or strips upon the same to thereby obtain a finished carpet product. Latex solutions are primarily used for the cementing or bonding of the threads to each other or of the strips to the base.

The invention is further concerned with devices with the aid of which it is possible to obtain chenille furs or carpet fabrics in substantially continuous operations whereby any interruption that may be required is solely occasioned by the necessity for exchanging warp or weft spools. It is then further possible to print upon the chenille furs during the course of their manufacture a suitable pattern for the ultimate carpet so that it is in effect possible to manufacture the final carpet product in substantially a single operation starting with the raw yarn and an appropriate base fabric or mat. The machine, in accordance with the invention, is primarily characterized by the combination of the following elements:

(a) Means for the unreeling of the warp or chain threads from a chain beam for passage through the entire machine with a substantially uniformly regulable speed whereby the driving motor is preferably also to furnish the drive for the circulating weft thread guide, if necessary by way of suitable gearing or transmission, preferably also effecting the rotation of other transport or guide rolls;

(b) Means for the coating of the warp threads with a suitable bonding, cementing, or other similar agent;

(c) An arrangement for supplying weft threads from suitable supply spools thereof and in a direction substantially at right angles to the direction of movement of the chain or warp threads;

(d) Cutting means for cutting the strip or ribbon composed of the chain threads and the thereto transversely cemented warp threads along the individual chain threads;

(e) Means for the lifting up of the weft thread pile which is cemented or bonded to the individual chain threads so that thereby the so-called chenille fur is produced; and preferably in addition to the foregoing;

(f) Means for the bonding or cementing of the thusly produced chenille furs upon a suitable base which may be reeled off from a special supply roll together with the chain or warp threads.

The invention will be more fully understood and further objects thereof will appear from the following description read in conjunction with the drawings in which:

Fig. 8 represents essentially a cross-sectional side view partly in section of an alternative embodiment of a construction in accordance with the invention and corresponding to the representation illustrated in Fig. 2;

Figure 1:
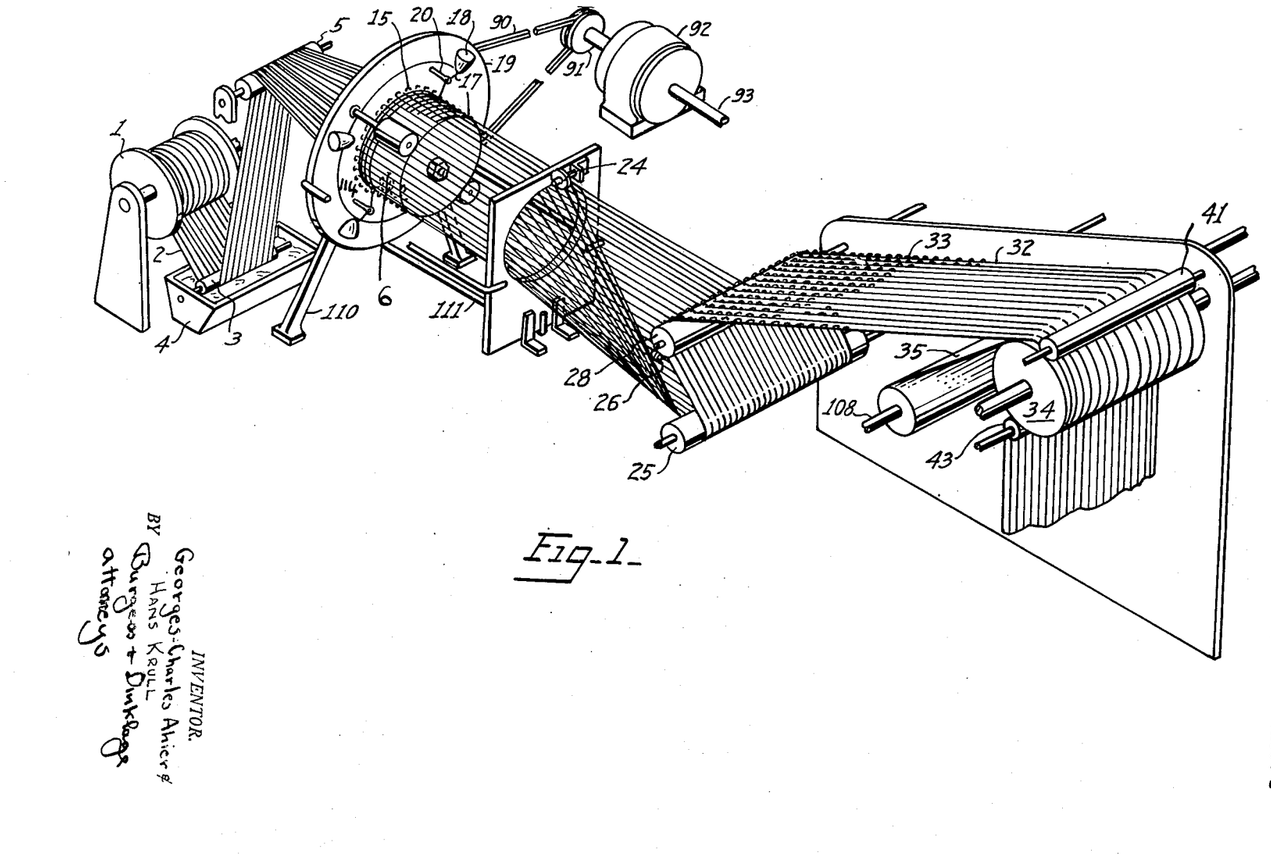
Fig. 1 illustrates a diagrammatic perspective view of a device constructed in accordance with the invention.
Figures 1A, 4, 5, 6, 19, 20:
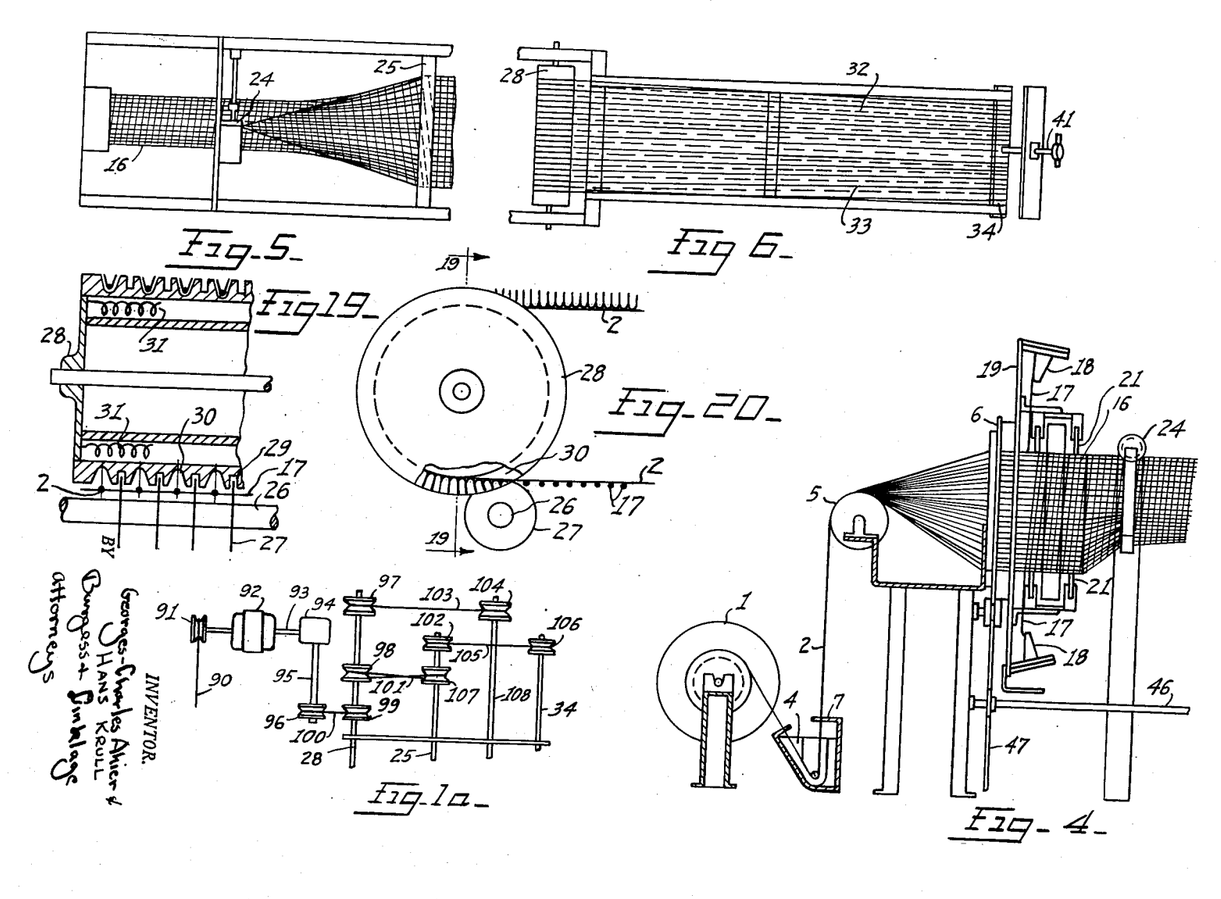
Fig. 1a represents the diagrammatic top view of an embodiment of the drive means of the invention, where a single motor is used to drive the entire device.
Fig. 4 illustrates a diagrammatic side view partly in section of part of the construction shown in Fig. 1.
Fig. 5 is a diagrammatic top view of part of the construction shown in Fig. 1 and illustrates the path of travel of the warp or chain threads carrying the weft threads and the cutting of the resulting tubular member into a substantially flat strip or ribbon.
Fig. 6 represents a diagrammatic top view of part of the construction shown in Fig. 1 illustrating the further course of the chain or warp threads after the cutting operation as well as showing the tracks serving the formation of the chenille fur.
Fig. 19 illustrates a diagrammatic cross-sectional view taken on line 19—19 of Fig. 20 of part of the cutter roll and wedge notch roll construction.
Fig. 20 represents a diagrammatic side view of the construction shown in Fig. 19.

As illustrated, for instance in Figs. 1 and 4, the chain or warp threads 2 on chain beam 1 pass over a guide roll 3 which dips with its lower surface into a trough 4 which is filled with a suitable bonding or cementing agent such as for example a rubber latex solution. The chain beam 1 may be provided with a suitable braking mechanism for the regulation of the thread tension. The chain or warp threads are coated in the trough 4 with the bonding or cementing agent and are then passed by way of the guide roll 5 to the circular chain thread guide 6. If desired, a press roll (not shown) may be arranged above the guide roll 5 for the purpose of removing surplus coating material. Alternatively, scraper combs 7 may be arranged for the chain or warp threads preceding the guide roll 5 in order to obtain a clean uniform wetting of the chain or warp threads by the coating liquid.

Figure 9:
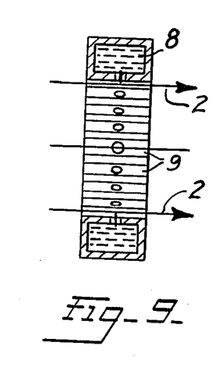
Fig. 9 is a diagrammatic cross sectional view on the lines 9—9 of Fig. 10.
Figure 10:
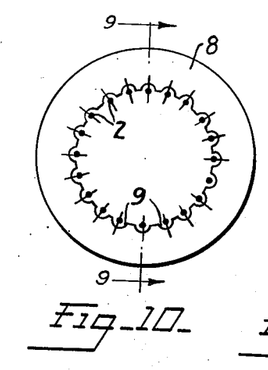
Fig. 10 is a diagrammatic side view of Fig. 9.
Figures 11, 12, 27, 28, 29A, 29B, 30:
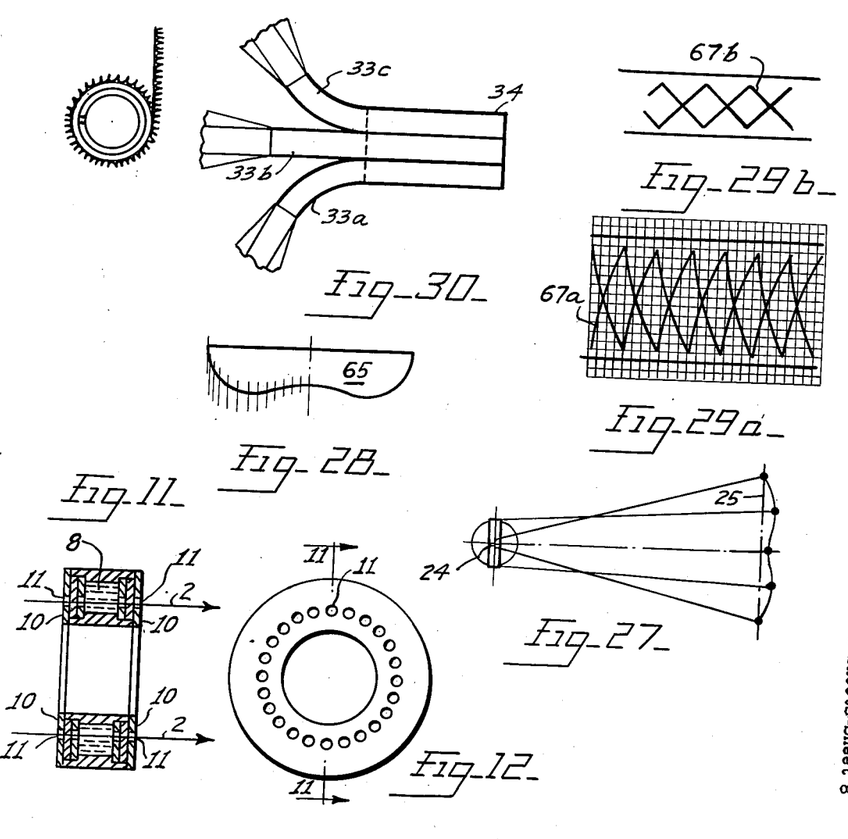
Fig. 11 is a diagrammatic cross sectional view on the line 11—11 of Fig. 12.
Fig. 12 is a diagrammatic side view of Fig. 11
Fig. 27 illustrates a diagrammatic representation showing the fabric formed of the chain or warp threads and the thereto bonded weft threads after the cutting of the fabric tube.
Fig. 28 is a diagrammatic side view of a guide member for compensating length differentials of the chain threads.
Fig. 29a illustrates diagrammatically a print pattern as it is printed upon the continuously moving chain thread strips or bands.
Fig. 29b shows diagrammatically the same pattern illustrated in Fig. 29a but on the final carpet product.
Fig. 30 illustrates a diagrammatic representation showing the bringing together of several chenille fur strips from a single plane onto a common carpet base.

Instead of coating the chain threads with the cementitious material when passing through a coating bath, it may be possible as illustrated in Figs. 9 and 10 to provide a substantially annular channel 8 just prior to the chain thread guide 6 and which annular channel is filled with the cementing or bonding material and carrying at its interior surface multiple openings 9 through which the bonding material may emerge. The chain threads 2 are passed through the inside of this annular guide channel along the exit nozzles for the bonding or cementitious material to be thereby coated with the bonding agent. An alternative construction of a bonding material applicator is shown in Figs. 11 and 12. The bonding material is contained in the annular channel 8 which is provided at its front and rear with the packing and stripping plates 10. Chain threads 2 are passed through the slotted openings 11 of the annular channel and are freed from excess bonding material by passage over the stripping plates 10 at the exit ends of the channels.

Figure 13:
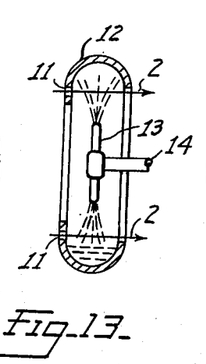
Fig. 13 is a diagrammatic cross sectional view on the line 13—13 of Fig. 14.
Figure 14:
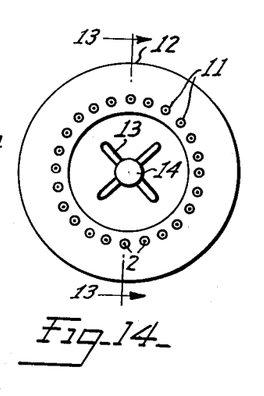
Fig. 14 is a diagrammatic side view of Fig. 13.

It is also possible to provide a mechanism for the bonding agent impregnation or coating in accordance with the illustrations of Figs. 13 and 14. As there shown, an annular housing 12 is provided within which the water wheel 13 rotates and to which the bonding material is passed through its hollow axle 14. The annular housing 12 possesses passage apertures 11 for the chain threads 2 and substantially uniformly distributed equidistantly from the center. Rotation of the water wheel 13 which is of the Segner water wheel type, causes the bonding agent to be sprayed in the form of fine jets into the housing 12 thereby obtaining a wetting of the chain threads. As illustrated in the embodiment shown in Figs. 11 and 12, stripping plates 10 may be arranged at the exit end of the annular housing 12 for the purpose of stripping excess bonding or cementitious agents from the chain threads.

The chain thread guide 6 is provided with circularly arranged apertures 15 corresponding in number to the number of chain threads, the latter being passed through these apertures. In this manner, a substantially circular tube is obtained. The chain threads are passed in this form over the working cylinder 16, the diameter of which corresponds approximately to the diameter of the thread guide 6, and it is at this point that the weft threads 17 are added. The weft threads are on the weft spools 18 which in turn are secured on a substantially circular disc 19. The latter is rotated during the operation of the machine and the weft threads 17, reeling off the spools 18 are in this manner spirally wound over the working cylinder 16, and thus over the continuously moving chain threads 2. For the purpose of regulating the tension of the weft threads as they reel off from their spools, thread-tension regulators are provided which rotate together with the weft spools. These weft thread-tension regulators may for instance include or consist of spring-tensioned rolls or the like. In order to assure the bonding or cementing of the weft threads upon the chain threads which are impregnated with the bonding or cementing agent, rolls 21 are preferably provided on the disc 19 and in between the weft spools and which press or bear against the surface of the working drum or cylinder 16, thereby also providing for the smoothed positioning of the weft threads. Working cylinder 16 is preferably a heating cylinder so as to effect by way of heat exchange a coagulation or solidification of the cementing or bonding agent so that the weft threads are thereafter securely fixed upon the chain threads. For the purpose of avoiding a deleterious influence upon the therewith contacting threads, the working cylinder is preferably chromium plated.

Figure 15:
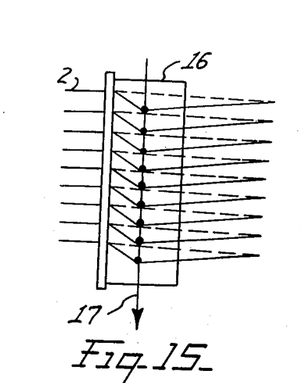
Fig. 15 is a diagrammatic top view of the working cylinder with the continuously moving chain or warp threads thereon.
Figure 16:
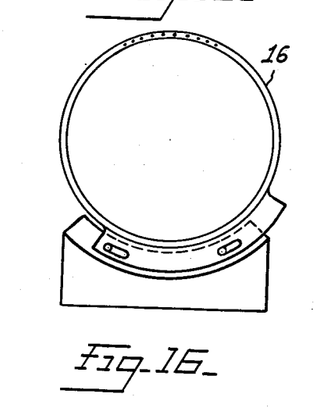
Fig. 16 is a diagrammatic end view of the cylinder shown in Fig. 15, on a base.

Chain threads 2 are easily shifted on working cylinder 16 out of their normal position by the winding of the weft threads 17 as is, for instance, illustrated in Fig. 15. In order to avoid such shifting of the chain threads and to bring the same again in a substantially straight position as is indicated by broken lines in Fig. 15, it is of advantage to rotate the working cylinder 16 in a substantially continuous manner so that the chain threads 2 of the surface of the cylinder will be shifted substantially to the same extent in one direction as they are shifted in the opposite direction by the application of the weft thread 17.

Figure 17:
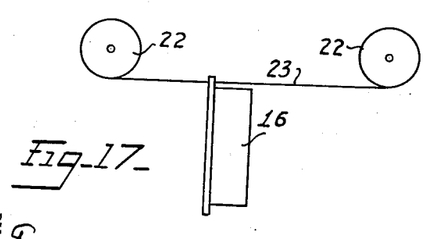
Fig. 17 and Fig. 18 are diagrammatic side and top view representations respectively of the working cylinder shown in Figs. 15 and 16.
Figure 18:
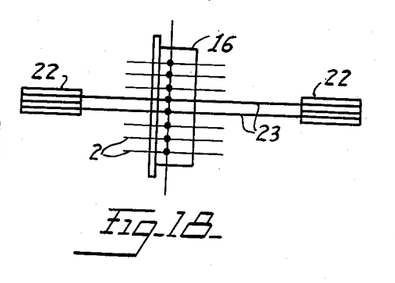

In lieu of the arrangement just described, it is also possible, as illustrated in Figs. 17 and 18, to provide above the working cylinder 16 guide rolls 22 for two metal threads 23 which pass over the working cylinder 16 in place of the two uppermost chain threads and which will be included in the winding of the weft threads 17. Inasmuch as these metallic threads 23 do not, however, carry a bonding agent, no cementing together or bonding occurs of the weft threads 17 to these metallic chain threads. Since, on the other hand, the metallic chain threads 23 may be placed under any desired tension, they will not be shifted from their normal position by the transversely winding weft threads 17.

After the formation of the fabric tube, a cutter 24 cuts the same at its periphery along the chain threads whereupon the cut material is folded apart into a substantially flat piece of fabric or ribbon. If the two metallic chain threads 23 were provided in the upper portion of the tube, the latter is cut between these metal threads. The metal threads which have no connection with the rest of the fabric, are then returned by way of the rolls 22. The folding apart of the tube is effected with the aid of the guide roll 25 which may be provided, if desired, with notches or grooves for the positive guidance of the chain threads. As may be seen from the drawings, the cemented or glued-on weft threads are positioned at the underside of the continuously moving chain threads.

In order to reduce the length of the machine, it is possible to return the ribbon which has been produced by way of the guide roll 25 so that the same will now move in the opposite direction being then passed to the cutter roll 26 which is armed with as many cutters 27 as correspond to the number of chain threads. The weft threads are then cut with the aid of this cutter roll, each cutting being effected in between the chain threads so that each individual chain thread is now provided with a weft thread pile or tufting, the ends of which extend to the left and right of the chain thread.

The cutter roll 26 is illustrated, for instance, in Figs. 19 and 20 on a magnified scale. The same may cooperate with a roll 28 which is provided with corresponding grooves 29 for the cutters or knives 27. Roll 28 preferably carries in between the grooves 29 wedge notches 30 into which the chain threads 2 will position themselves together with the thereto secured weft thread pile or tufting. Chain threads 2 carrying the weft thread tufting are passed around roll 28 while within these wedge notches or grooves 30. Roll 28 is preferably heated such as for example with the aid of an electric resistance heater 31 in which case the threads positioned in these wedge notches or grooves will be subjected to a treating effect while being passed over the roll, similar to that of the pressing of a material. This treatment causes the weft thread tufting or pile carried by the chain threads 2 to be lifted up so that there is formed in this manner a product usually and hereinafter designated as a chenille or chenille fur such as the chenille fur 33 illustrated in the drawings.

The chenille furs pass from roll 28 onto the track elements 32. These tracks 32 possess a U or V shaped cross-section and complete the lifting of the tufting or pile of the chain threads carrying the weft tufting or pile as these pass through the tracks.

If the chain threads were permitted to continue their course at about the distance from each other that they have assumed up to this point of the device, the chenille furs formed would be at too great a distance from each other so that it would not be possible to form a reasonably close carpet product. For this reason the track 32 are arranged to converge at their exit end towards which the chain threads move. In order to accomplish this without hinderance of some of the channel tracks 32 by other such tracks, it may be of advantage to so arrange channel tracks 32 as for instance shown in Fig. 7 that the same are essentially provided in two planes 32a and 32b the exit ends of which will partially overlie each other.

For the purpose of obtaining a substantially permanent lifting of the weft thread pile or tufting in the channel tracks, it is also of advantage to moisten the weft pile carrying chain threads prior to their entrance into the channels. This may be accomplished with any desired conventional finishing or sizing material. Particularly advantageous in this respect are solutions of the so-called cation-active soaps which possess an especially good penetrability for the threads that are usually composed of wool by reason of their opposed electric charges. The channels or tracks 32 are also preferably heated and will then further effect an ironing action upon the threads passing therethrough so that a substantially permanent lifting of the weft tufting or pile is assured upon the passage through these channels.

Chenille furs 33 which have been formed in these channel tracks and which are now closely positioned next to each other are then cemented or bonded upon the carpet base 35 of the roll 34. The carpet base which may be composed of stramin, felt, rubber, or any other appropriate or suitable material, is provided on the supply roll 36. The base material is passed along a moistening roll 39 by way of the guide rolls 37 and 38, the moistening roll 39 dipping into the trough 40 which is also filled with a bonding or cementing material. Also in this case the bonding or cementing material may be rubber latex. Roll 39 which is rotated frictionally by the base material will continuously transfer an appropriate amount of the bonding or cementing agent upon the underside of the carpet base. Guide roll 37 serves simultaneously as a return roll so that the side of the base which is coated with the bonding or cementing agent will now face upward. The same passes then together with the chenille furs 33 and below the same upon the drum or cylinder 34, the chenille furs being bonded or cemented with the aid of press roller 41 upon the base surface coated with bonding or cementing material. Drum 34 is preferably heated so that simultaneously a coagulation and thus a substantially permanent cementing or bonding of the chenille furs to the carpet base occurs. For the purpose of obtaining a sufficiently long period of coagulation, it is desirable to pass the base material together with the thereto bonded over the maximum possible circumferential length of the drum. A guide band or ribbon 42 may be provided for this purpose, the same being passed closely along the surface of drum 34 by way of the guide rolls 43 so that an intimate contact of the freshly-glued or cemented carpet material with roll 17 is assured. The final carpet may then be rolled up in conventional manner.

Figure 21:
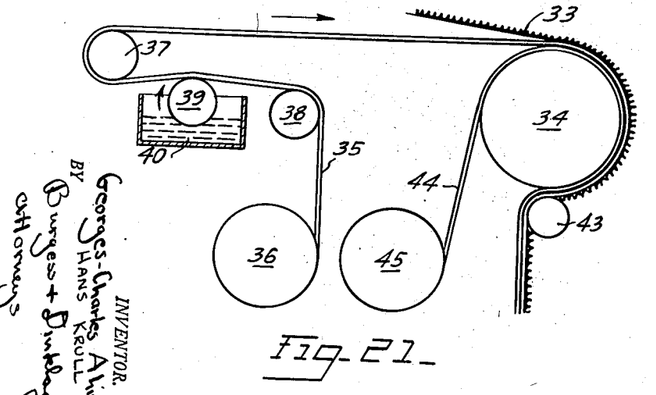
Fig. 21 exemplifies a diagrammatic side view arrangement for the cementing of the chenille furs upon two superimposed base materials.

Instead of using a single base for the carpet, it is also possible, as illustrated in Fig. 21, to use two such base materials. In this case, the first such base 35 is preferably of a substantially porous character so that the bonding or cementing material passed onto the same by roll 39 penetrates the pores or perforations of this base. The second such base material 44 is reeled off from a supply roll 45 and is secured from below on roll 34 to the intermediate material by way of the base 35 which is coated on both sides while the chenille furs 33 are glued to the upper side of the intermediate layer material.

Figure 34:
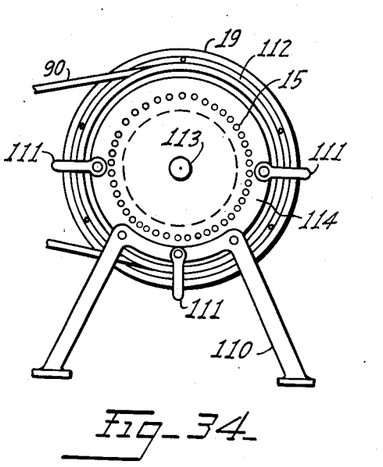
Fig. 34 illustrates a diagrammatic front view of the chain thread guide, the weft thread winding means and drive pulley of the construction illustrated in Fig. 1.
Figure 35:
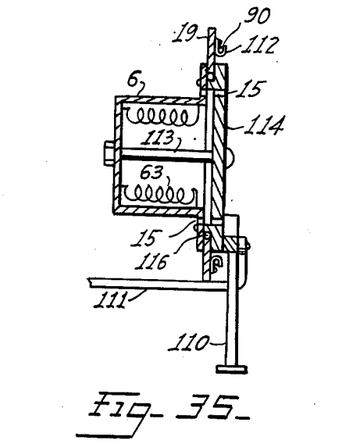
Fig. 35 is a diagrammatic side view partly in section of Fig. 34.

The weft spool carrier 19 is rotated by a motor 92. As the pulley 91 is rotated by the motor 92 it rotates pulley 112 (see Figs. 34 and 35) by means of a drive belt 90. Pulley 112 is attached to the weft spool 19 which rotates on bearing 116 around the stationary chain thread guide 6. The chain thread guide 6 consists of a drum and disk 114 which are supported by a stand 110 and are attached to the support of cutter 24 by rods 111.

In the alternate embodiments (Figs. 2 and 3) drive belt 90 is attached to a pulley 54a encircling carrier arms 54.

The motor 92 may be used to drive the entire device as shown in Fig. 1a. The other end of the motor shaft 93 is attached to a gear box 94 which drives pulley 96 through shaft 95. Pulley 99 attached to roller 28 is driven in the same direction as pulley 96 by a drive belt 100. Pulley 97 on the same shaft 28 drives roller 108 in the same direction by means of a belt attached directly to its pulley 104. Pulley 98 also on roller shaft 28 is connected to pulley 107 on roller 25 by means of a crossed belt 101, thus roller 25 is made to rotate in the opposite direction. Pulley 102 on shaft 25 is connected by a direct belt drive to pulley 106 on shaft 34 causing shaft 34 to rotate in the same direction as shaft 25. Thus shafts 28 and 108 are caused to rotate in the opposite direction to the rotation imparted to shafts 25 and 34. All the rollers are supported and allowed to rotate on the support plates shown in Figs. 1, 2 and 3. Only one support plate is shown where the insertion of both would obstruct the view of the working parts of the device.

Figures 4, 22, 23:
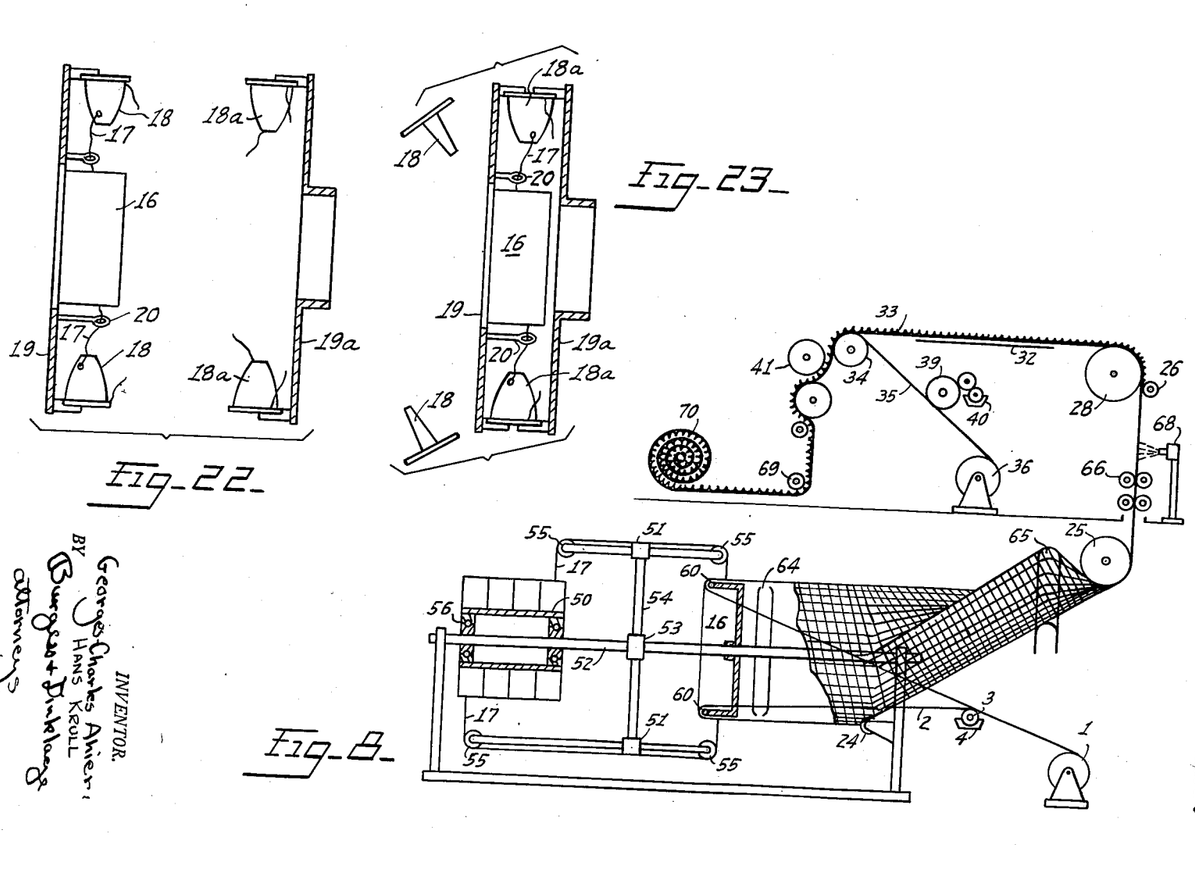
Figs. 22 and 23 are diagrammatic side view representations partly in section showing weft spool discs and particularly at the moment of the change of the weft spools.

Inasmuch as the weft spools 8 are relatively quickly empty, the machine described up to this point will require a relatively frequent stoppage for the purpose of changing the used-up weft spools and to insert new fully-charged spools. For this reason, weft spool carrier 19 may be arranged as a double carrier, as is for instance exemplified in Figs. 22 and 23. As there shown, weft spool carrier 19 has an oppositely arranged thereto substantially congruous weft spool carrier 19a. The change or exchange of weft spools is substantially automatic when utilizing this arrangement. At first, weft spool carrier 19 rotates with its completely charged spools around working cylinder 16. Carrier 19a is then in non-engaged position, being charged with the replacement spools 18a. As soon as spools 18 on carrier 19 are almost completely reeled off, carrier 19a will begin rotation until it rotates substantially synchronously with the carrier disc 19. The moment weft thread 19 is run off from spool 18, the ends of the threads of the old spools are connected with the beginning of the threads of the new spools in a substantially automatic manner. Disc 19a will now move into the position for instance illustrated in Fig. 23 forcing empty spool 18 from its spring-cushioned support by the insertion into this support of the new spool 18a. Supply disc 19a then returns and is again brought into non-engaged position and may then be once more charged by an operator with new spools.

Figure 2:
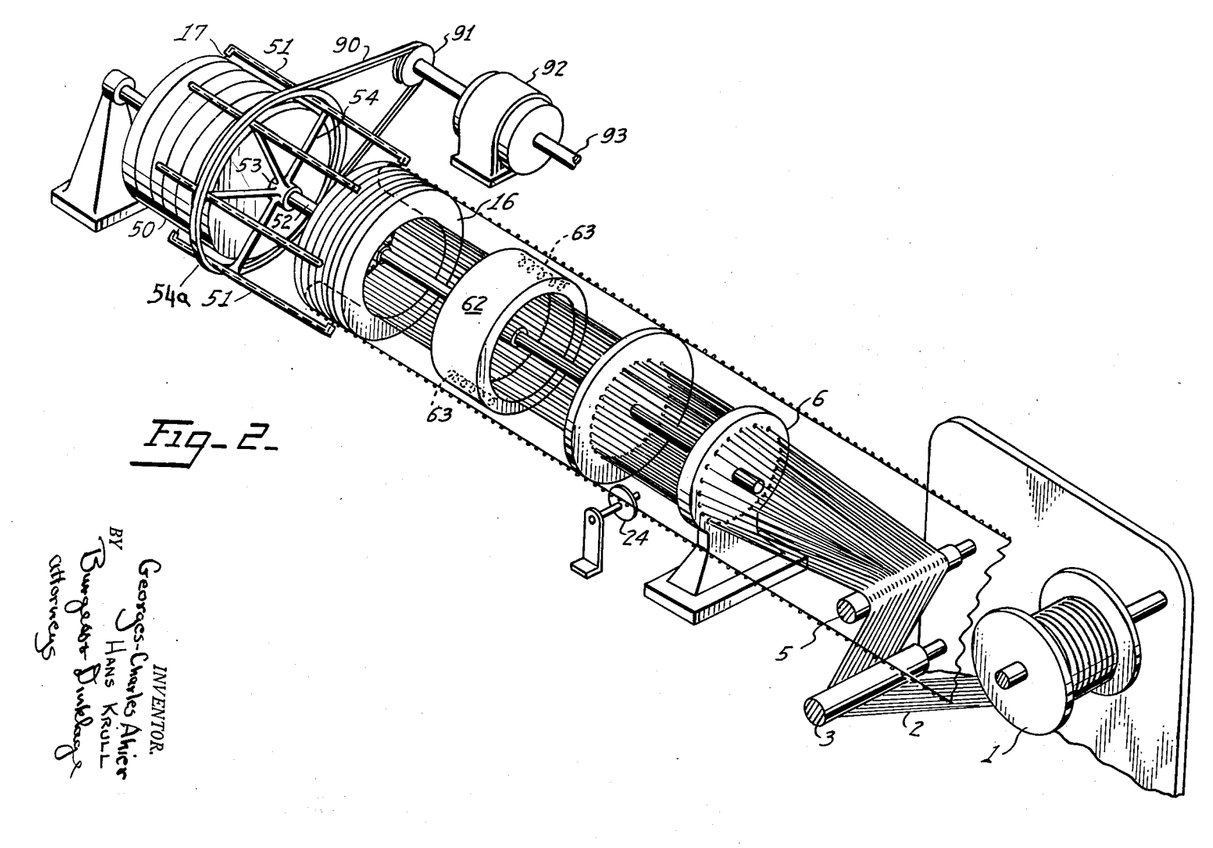
Fig. 2 is a diagrammatic perspective view of an alternative embodiment of a device in accordance with the invention.
Figure 3:
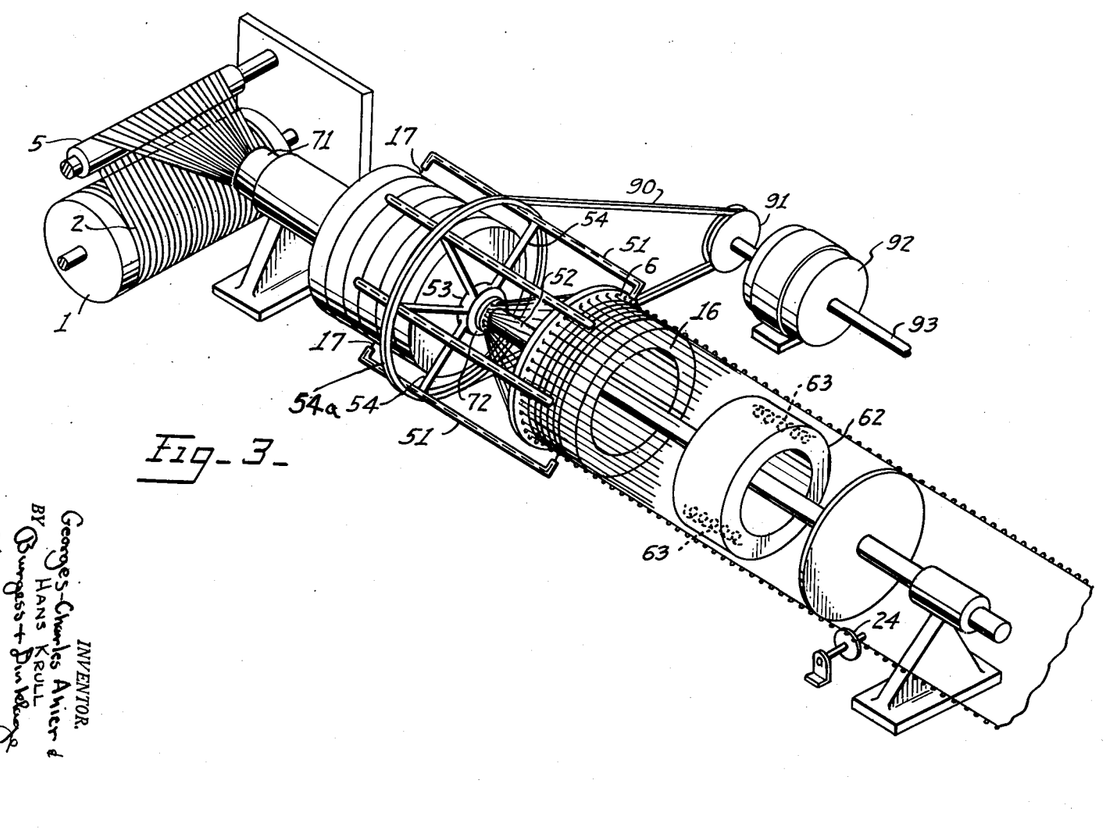
Fig. 3 is a diagrammatic perspective view illustrating a further alternative embodiment of a construction in accordance with the invention.

Another embodiment of the invention, and in which a relatively frequent change of weft spools is avoided so that a longer uninterrupted operation of the machine is assured, is for instance illustrated in Figs. 2 and 8. The weft threads are in this case arranged on the weft spool beam 50 having an axis in continuation of that of the working cylinder 16. Weft threads 17 are passed from weft spool beam 50 over rotating thread guides 51 secured upon shaft 52 by way of the cross coupling 53 and carrier arms 54 and thence over suitable return rolls 55 to the working cylinder 16. The weft threads are preferably subdivided into several fields (as for example 4 or 6 fields) whereby each weft thread field is provided with a cycling thread guide 51. Instead of subdividing weft threads into individual fields, it is also possible to secure several different weft thread spools upon the weft spool beam 50.

The individual thread guides 51 are distributed at appropriate angular distances from each other along the circumference of the weft spool beam, and thus of the working cylinder 16. For the purpose of obtaining the easiest possible unreeling of the weft threads 17 from the weft thread beam 50, the latter is arranged or mounted to be readily rotatable upon shaft 52 as for example with the aid of the ball bearing 56 so that the same may easily rotate along with the unreeling of the weft threads through the rotating thread guide 51.

Figures 7, 24:
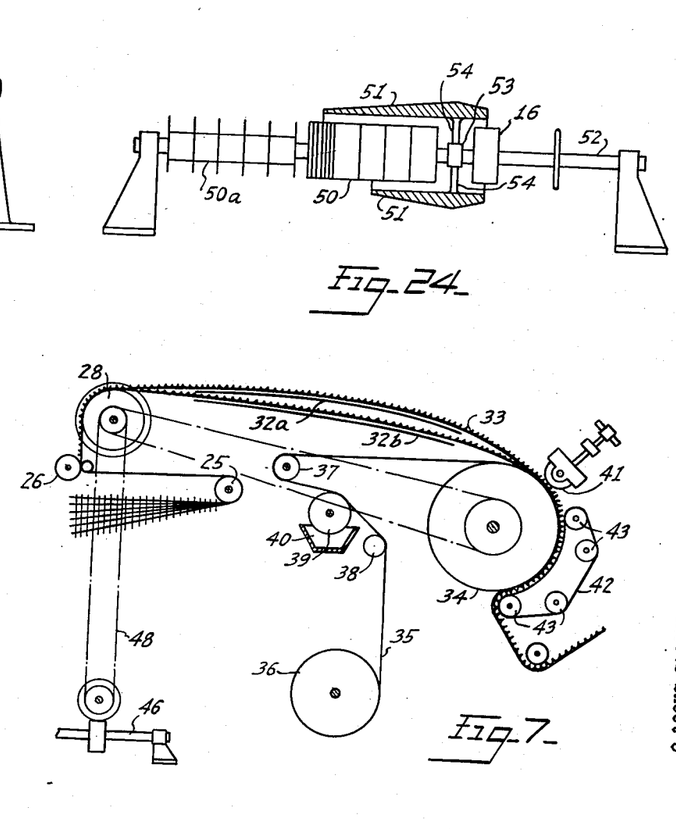
Fig. 7 is a diagrammatic side view of a portion of a construction in accordance with the invention and representing a part following in sequence that shown in Fig. 4.
Fig. 24 shows a diagrammatic view partly in section of a weft spool beam.

Fig. 24 illustrates diagrammatically the change of reeled-off weft beam through a new one which is fully spooled. For this purpose, the two weft beams 50 and 50a are arranged on the same shaft 52. While the operatively connected weft beam 50 is being spooled off, the spooled-off beam 50a is freshly reeled in the same operation. As soon as beam 50 is empty, the same is brought into the position of beam 50a, moving the latter, which has been re-spooled in the meantime, into operational engagement.

Figure 25:
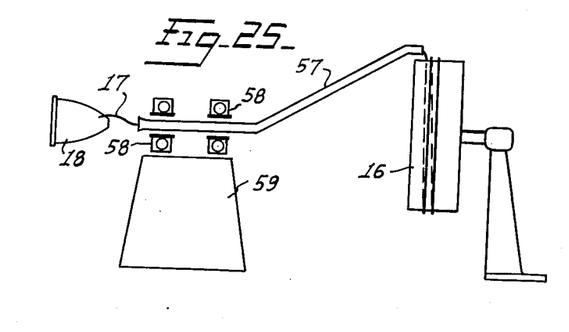
Fig. 25 is a diagrammatic representation showing the winding of a single weft thread upon the working cylinder.

Instead of taking the weft threads off several individual fields by way of several thread guides, it is also possible to provide a single weft thread spool 18 from which the thread may be unreeled overhead so that this spool need not to rotate. In this case, only a single thread guide 51 is required, which will wind the weft thread spirally upon the working cylinder 16. Fig. 25 shows diagrammatically such an arrangement. The weft thread 17, running off weft spool 18, passes through a thread guide 57 mounted on ball bearing 58 to be readily rotatable on support 59 to be thereafter wound in the manner herein described upon the working cylinder 16 and the chain threads thereon (not shown in this illustration). Such an arrangement, however, presupposes a considerable rotational velocity of the thread guide 57 so as not to decrease too much the speed of movement of the chain threads and the therewith coupled production capacity of the machine.

When arranging a single substantially stationary weft thread spool, no changes are as such necessary for the supplying mechanism of the chain threads of the type as they have been hereinabove described. If, however, several weft threads from different fields are reeled off a rotating weft beam such as weft beam 50, that side of the working cylinder 16 on which the chain thread supply normally occurs will not be free. The chain threads will therefore have to be passed to the working cylinder 16 in a substantially backwards direction, that is, counter the movement of the tubular fabric. For this purpose, the working cylinder is constructed substantially hollow. The chain threads 2 will then pass (see Figs. 2 and 8) similar to the above described embodiments of the machine, from a chain beam 1 over a wetting roll 3 serving to coat the chain threads with a cementing or bonding material from trough 4, and, as the case may be, over a return roll 5 through the circular thread guide 6 which brings the chain threads into substantially tube form, and thence through the interior of the hollow working cylinder 16. The chain threads are passed, if necessary, by way of the return rolls 60, from the front side of the working cylinder 16 over the outer surface thereof. Weft threads 17, guided by thread guide 51, and return rolls 55, are then wound over the outside of the working cylinder 16 in the same manner hereinabove described in connection with the other embodiments of the invention for bonding contact with the chain threads 2 impregnated with the bonding or cementing material.

In the above described embodiments of the device in accordance with the invention, the shaft of the working cylinder 16 was positioned in a substantially horizontal direction. It is, however, also possible to arrange the working cylinder in a substantially vertical position and to move the chain threads from bottom to top over this working cylinder. Such an arrangement is, for instance, illustrated in Fig. 26. The chain threads 2 pass in this case in the usual manner from chain beam carrier over a return roll 5 and as shown in Figs. 2 and 8 to the interior of the working cylinder 16 in a downward direction. At the lower edge of the working cylinder 16 a bonding material trough 4 is provided carrying the return rolls 3. When the chain threads are passed over these return rolls, they are coated with bonding or cementing material and will then be moved upwardly on the outside of the working cylinder 16 in substantially tubular form. After the tube has been cut, as hereinabove described such as in Fig. 1, the weft threads 17 are supplied in the manner shown in the embodiment illustrated in Figs. 2 and 8 from a weft beam 50 subdivided into fields and with the aid of a rotating thread guide 51 which for simplicity's sake is, in this case, rotatably mounted in bearing 61 below weft beam 50.

Figure 26:
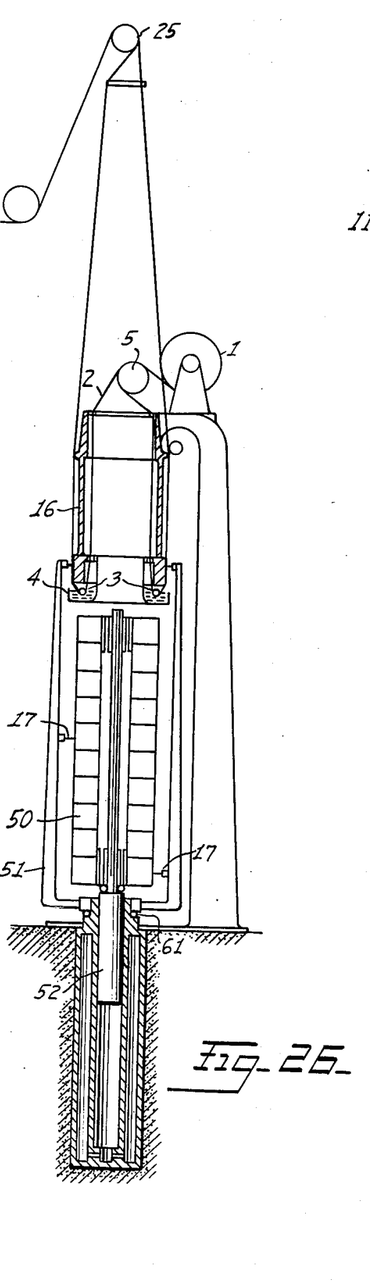
Fig. 26 represents a diagrammatic front view partly in section of the head portion of a machine in accordance with the invention.

In order to permit an exchange of the unreeled weft beam for a newly reeled beam, the weft beam is provided with a retractable shaft 52. After retraction of the shaft, the empty weft beam may be easily removed from between the thread guides 51 and may then be replaced by a new completely reeled beam.

In the embodiment according to Fig. 2, the drying of the cementing or bonding agent and thus the bonding of the weft threads 17 to the chain threads 2, is accomplished not on the working cylinder 16 but rather separated from the same in a special drying cylinder 62 which may be most simply electrically heated such as by way of the heating spirals 63. By separating the drying cylinder 62 from the working cylinder 16, a premature sticking or gluing together of the threads is avoided which may otherwise lead to operational difficulties.

In lieu of accomplishing the drying by way of a drying cylinder 62, it is sometimes of advantage, depending upon conditions, to provide a rotating tube 64 as shown in Fig. 8, behind the working cylinder 16, warm air passes out of the openings of this tube which are directed against the inner sides of the tube, thereby accomplishing the drying and bonding together of the threads. This warm air tube 64 is preferably mounted rotatably upon the same shaft 52 which effects the rotation of the rotating thread guide 51.

The further construction of the machine corresponds essentially to that shown in Figs. 4 and 7. The tubular fabric will be cut as there described by a cutter 24 arranged at the periphery of the tube, the cutting taking place along the chain threads so that a substantially flat band or ribbon is obtained which is continuously moved away by the roll 25. The embodiment shown in Fig. 8 is provided with a guide sheet of for instance sheet metal or with a guide card 65 prior to the roll 25, the guide sheet or card being so contoured that a substantially uniform tension is obtained for all chain threads of the in a plane unfolded band or ribbon. As may be seen from Fig. 27, which shows diagrammatically a path of travel of the cut tubular fabric from the moment of its cutting up to the removal roll 25, the particular path which the various chain threads have to traverse from their cutting down to roll 25 may be different from case to case. For the purpose of compensating this difference in the path of travel, the cut band or ribbon is passed over the expansion guide 66, the upper edge of which corresponds approximately to the curve represented in Fig. 28. In this manner, it is possible to obtain for all chain threads of the band or ribbon a substantially uniform tension on their way up to the pull-off roll 25.

In order to obtain as exact as possible substantially uniform tension of the chain threads, it is furthermore of advantage to so mount the rotating thread guide 6 which passes the chain threads onto the working cylinder 16 in the form of a tubular arrangement, that it is axially rotatable into any desired fixed position.

The band or ribbon reeled off roll 25 is passed as illustrated in Fig. 8 through printing rollers 66 which print a pattern upon the strip of chain threads carrying the transversely arranged weft threads. Inasmuch as the chain threads are positioned in this portion of the machine at an appreciably greater distance from each other than they will eventually assume in a finished carpet, it is necessary to provide the pattern on the printing rollers in appropriately distorted or elongated form. Fig. 29a shows the pattern 67a in the form in which it will be printed upon the moving chain thread strip, while Fig. 29b shows the same pattern 67b as it will appear in the finished carpet. Fig. 29a shows clearly that it is necessary by reason of the continuous movement of the chain thread strips to impart a certain curvature to those lines which are to appear as straight lines in the finished pattern so as to compensate for the continuous shifting of the strip. This, however, is true only for such lines of the pattern which are not exactly located in the direction of travel of the chain thread strip.

An applicator device 68 is provided beyond printing rolls 66 as is illustrated in the embodiment of the device in accordance with Fig. 8, for the purpose of applying to the continuously moving chain thread strip a finishing or sizing material, and preferably of the cation-active soap type, in order to secure a substantially permanent lifting of the weft tufting or pile in the heated guide channels 32.

The chain thread strip printed and impregnated in this manner is now cut into strips as illustrated in accordance with the above described embodiment of the device, the cutting being effected by way of the cutter or knife roll 26 lengthsides of each chain thread, whereupon the same is passed over the guide roll 28, preferably provided with wedge channels or grooves, thence passing to the guide channels 32 which are preferably heated as above set forth. The lifting or turning of the weft thread pile or tufting is obtained in the latter, and in this manner the formation of the chenille fur 33 occurs.

The chenille furs are then bonded or cemented upon the carpet base 35 upon the drum 34 as previously described, the base being reeled off supply roll 36 passing on its way a coating or impregnating roll 39 serving to coat the surface of base 35 with bonding material or agent contained within trough 40. Roll 41 is used for pressing the chenille furs upon the base in order to achieve a good bonding thereof. The finished carpet product is finally wound onto supply reel 70, and, if necessary, by way of the further counter-directional guide rolls 69. For the purpose of avoiding the turning back of the chain threads over working cylinder 16, a further alternative embodiment of the head of the device may be used as is, for instance, illustrated in Fig. 3. This embodiment is provided with the hollow shaft 71 of the wedge spool beam. Chain threads 2 reeling off chain beam 1 in the usual manner by way of the return roll 5, and which, as has been previously described, may be coated with a bonding or cementing material, are then passed through this hollow shaft 71 being thence passed through the circular thread guide 72, secured to the back side of the hollow shaft, in the shape of a tubular arrangement of threads surrounding the rotary shaft 52. The emerging chain threads are then passed in the before-described manner through the circular thread guide 6 onto the surface of the working cylinder 16 and are here wound with the weft threads 17 as hereinabove illustrated. Similar to the embodiment shown in Fig. 2, a heating cylinder 62 having the heating coils 63 is arranged beyond the working cylinder 16. The tubular fabric formed is then cut by way of the knife member 24 in the same manner herein previously described. The further working up of the opened ribbon or web obtained in this manner is similar to that exemplified in connection with Figs. 7 and 8.

Figure 31:
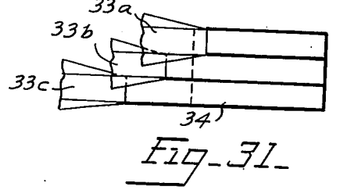
Fig. 31 illustrates diagrammatically the bringing together of several chenille fur strips from different planes.
Figure 32:
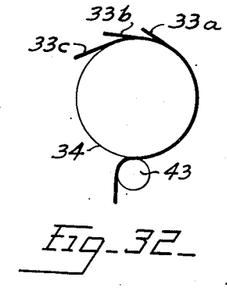
Fig. 32 is a diagrammatic side view representation of Fig. 31.

Inasmuch as the width of the machine cannot be varied to any desired extent if a positive guidance of the chenille fur strip is to be obtained, there may be arranged in accordance with the invention, a multiple number of chenille fur strips for the purpose of obtaining any desired width of carpet products, the strips being brought together upon a single base from several individual chenille fur strip-making units. Fig. 30 illustrates diagrammatically the passage of multiple chenille fur strips 33a, 33b, and 33c onto a common bonding drum 34. Inasmuch as in this embodiment individual chenille fur strips have to be passed onto the bonding drum 34 from the side and with a certain curvature, it is of advantage to so arrange the construction that the chenille fur strips may be fed from different heights to the common bonding drum 34. Such a construction is diagrammatically illustrated in Figs. 31 and 32. The chenille fur strips 33a, 33b, and 33c which come from separate units arranged at different heights, are passed in immediate adjacency to each other upon the bonding drum 34. As is apparent from the illustration, almost any desired carpet width may be obtained in this manner.

Figure 33:
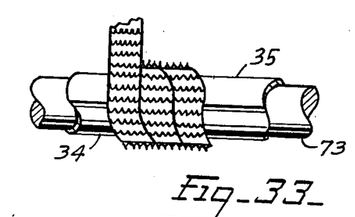
Fig. 33 exemplifies by way of diagrammatic side view representation a spiral winding of a chenille strip onto a carpet base.

A further alternative construction for the manufacture of wide carpet products is shown in Fig. 33. The bonding drum 34 is here continuously shifted sidewise during its rotation by way of a pin or spike 73 so that the chenille fur strip 33 is spirally wound around roll 34. Also, with this arrangement, carpets of any desired practical width may be obtained. It is then necessary to cut the finished carpet product lengthsides of the roll and the length of such a carpet depends upon the circumference of the roll, for which any desired diameter may be selected.

We claim:

1. In the manufacture of chenille fabrics the improvement which comprises continuously moving a tubularly arranged chain of warp threads, continuously winding a weft thread in a substantially fixed path around the moving tube of chain threads and into contact therewith, continuously applying bonding material to at least one of said chain threads and said weft thread prior to said contact, continuously cutting substantially parallel to the chain threads the continuously moving tubular fabric formed, continuously opening the moving cut portion and continuously cutting said weft thread between each adjacent chain thread.

2. Improvement in accordance with claim 1 in which said open portion is continuously cut between each two adjacent chain threads to leave cut weft ends extending from both sides of each chain thread and in which said weft ends are substantially continuously turned towards each other in planes substantially normal to their chain thread to thereby substantially form strips of chenille fur.

3. Improvement according to claim 2 in which said warp threads are continuously coated with said bonding material prior to said winding.

4. Improvement according to claim 3 in which said weft thread is continuously pressed into bonding contact with said warp threads.

5. Improvement according to claim 4 in which setting heat for said bonding material is supplied during said winding.

6. Improvement according to claim 5 in which setting heat is supplied during said turning of the weft ends towards each other.

7. Improvement according to claim 3 in which at least one wire is continuously moved with and is part of said tubularly arranged chain and in which said weft thread is wound on to said longitudinally moving tubularly arranged chain of warp threads by first contacting said wire.

8. Improvement according to claim 3 in which rotary motion is imparted to said tubularly arranged threads in a direction counter to the direction of weft winding thereover to thereby substantially prevent shifting of chain threads during the winding thereof.

9. Device for the continuous manufacture of chenille fabrics which comprises substantially circularly arranged multiple guide means for multiple warp threads, means for continuously moving warp threads in guided relation to said guide means to thereby define multiple paths of travel for such warp threads aggregating a substantially tubular pattern, weft thread guide means drivingly rotatable around said tubular pattern and defining a path of travel for winding weft thread around and in contact with any warp threads passing along said paths, bonding material supplying means positioned for applying bonding material to one of such warp threads and weft threads prior to said contact thereof, first cutting means positioned along the periphery of said tubular pattern beyond said weft thread guide means and dimensioned for longitudinally cutting moving tubular fabric formed, multiple second cutting means following said first cutting means, and one positioned in between the paths of travel defined for each two adjacent warp threads, and means for lifting cut weft ends of each warp thread and positioned along the further path of travel defined for such warp threads.

10. Device in accordance with claim 9 in which there is additionally provided means defining a warp thread support within said tubular pattern, in which said weft thread guide means are positioned for rotation around said support, in which said warp thread guide means are so positioned and dimensioned that said multiple paths pattern for warp threads is in substantially contact relation to said support, and in which said bonding material supplying means precede said warp thread guide means for bonding material application to warp threads passing in guided relation thereto.

11. Device in accordance with claim 10 in which said weft thread guide means are mounted on a drivingly rotatable member, in which at least one weft thread spool carrier is mounted on said rotatable member in weft thread supplying relation to its guide means, and in which said member is mounted for rotation of said guide means along a substantially fixed path of travel in a plane about normal to the axis of said tubular pattern.

12. Device in accordance with claim 11 in which fabric opening means are provided between said first and second cutting means being positioned and dimensioned to substantially open cut tubular fabric into substantially open web form.

13. Device in accordance with claim 12 in which press-on means are provided positioned and dimensioned for cooperation with said support to press wound weft thread into bonding contact with warp threads.

14. Device in accordance with claim 13 in which said bonding material supplying means include means defining a substantially annular supply chamber, defining on its interior surface mutliple bonding material outlets, and positioned to precede said multiple warp guide means for passage of warp threads in contact with said inner surface for bonding material application to such warp threads.

15. Device in accordance with claim 13 in which said bonding material supplying means include means defining a ring of apertures for warp thread passage therethrough, a substantially annular supply chamber surrounding said ring of multilpe apertures in flow communication with each aperture of said ring and positioned to precede said multiple guide means for multiple warp threads.

16. Device in accordance with claim 13 in which said bonding material supplying means include means defining a chamber, defining a ring of apertures for warp thread passage therethrough in substantially open communication with the chamber interior and positioned to precede said multiple warp guide means, and in which means are provided within said chamber for finely dispersing bonding material therein and into contact with threads passing through said apertures.

17. Device in accordance with claim 13 in which at least one substantially endlessly multiple metal thread is provided as part of said tubular pattern, and in which means are provided for linearly moving said metal thread in substantial synchronization with the moving means for said warp threads.

18. Device in accordance with claim 13 in which said fabric opening means include at least one fabric opening roll.

19. Device in accordance with claim 13 in which said second cutting means include a roll provided with multiple cutting blades spaced and positioned on said roll and in number sufficient for cutting action in between each 2 adjacent warp threads.

20. Device in accordance with claim 13 in which said lifting means for cut weft ends include heatable channel means being substantially of V-shaped cross-section.

21. Device in accordance with claim 20 in which said channel means are circumferentially defined on a heatable roller.

22. Device in accordance with claim 20 in which said channel means include heatable channel tracks.

23. Device in accordance with claim 22 in which said channel tracks are arranged for substantial convergence at their exit ends.

24. Device in accordance with claim 23 in which said converging channel tracks are provided in different planes.

25. Device in accordance with claim 13 in which drying means are additionally provided within said tubular pattern and following said weft thread guide means for heat setting the bonding connection between the warp and weft threads.

26. Device in accordance with claim 25 in which heat setting means include means for heating the surface of said support.

27. Device in accordance with claim 25 in which said heating means include such means positioned within said tubular pattern following said support.

28. Device in accordance with claim 27 in which said heating means include a surface heatable drum substantially coaxial to the axis of said tubular pattern and dimensioned for peripheral contact relation to warp threads moving along said paths.

29. Device in accordance with claim 27 in which said heating means include hot air dispensing means mounted rotatable within said tubular pattern.

30. Device in accordance with claim 13 in which a fabric guide member is interposed between said first cutting means and said fabric opening means for surface contact of the cut fabric therewith on its way from said first cutting means to said fabric opening means, and in which the fabric contacting surface defined by said fabric guide means is contoured for substantial compensation of length differentials of the fabric between said first cutting and fabric opening means.

31. Device in accordance with claim 30 in which said fabric opening means include a fabric opening roll.

32. Device in accordance with claim 13 in which a second rotatable member is provided opposite said first rotatable member, in which means are provided for moving said second rotatable member into operating position for weft thread guidance and moving said first rotatable member out of such position upon emptying of weft thread spool thereon.

33. Device in accordance with claim 32 in which means are additionally provided for connecting the reeled-off end of any weft spool thread on said first rotatable member to the weft thread beginning of a corresponding spool on said second rotatable member.

34. Device in accordance with claim 10 in which said weft thread guide means are mounted on a drivingly rotatable member, in which at least one substantially stationary weft thread spool carrier is mounted in the direction of the head of said support in weft thread supplying relation to its guide means on said rotatable member, in which said member is mounted for rotation of said guide means along a substantially fixed path of travel in a plane about normal to the axis of said tubular pattern, and in which fabric opening means are provided between said first and second cutting means being positioned and dimensioned to substantially open cut tubular fabric into substantially open web form.

35. Device in accordance with claim 10 in which said weft thread guide means are mounted on a drivingly rotatable member, in which multiple weft thread spool carriers are rotatably mounted on a weft beam positioned substantially on the same axis as that of said tubular pattern, over said support, said spool carriers being mounted in weft thread supplying relation to its guide means on said rotatable member, in which said member is mounted for rotation of said guide means along a substantially fixed path of travel in a plane about normal to the axis of said tubular pattern, and in which fabric opening means are provided between said first and second cutting means being positioned and dimensioned to substantially open cut tubular fabric into substantially open web form.

36. Device in accordance with claim 35 in which said weft beam is a substantially hollow weft beam, and in which means are provided for guiding multiple chain threads into the interior of said weft beam.

37. Device in accordance with claim 35 in which said support substantially defines a cylindrical surface with its axis positioned substantially vertically and in which said weft beam is downwardly retractably mounted.

38. Device in accordance with claim 13 in which said support defines a substantially hollow cylinder, in which means are provided for passing multiple warp threads through the interior of said cylinder, in a direction opposite the direction of travel thereof over said support, and in which means are provided for reversing the direction of travel of said chain threads emerging from said hollow cylinder by about 180°.

39. Device in accordance with claim 20 in which printing rolls are additionally provided following said heatable channel means for continuously printing carpet-making patterns onto the same.

References Cited in the file of this patent

UNITED STATES PATENTS

| Number | Name | Date |
|---|---|---|
| 939,839 | Himes | Nov. 9, 1909 |
| 1,195,949 | Harrison | Aug. 22, 1916 |
| 1,195,951 | Harrison | Aug. 22, 1916 |
| 1,338,164 | Angier | Apr. 27, 1920 |
| 1,850,301 | Gibbs | Mar. 22, 1932 |
| 2,266,761 | Jackson et al. | Dec. 23, 1941 |
| 2,475,019 | Faris | July 5, 1949 |
| 2,583,337 | Laing | Jan. 22, 1952 |
| 2,588,130 | Lemon et al. | Mar. 4, 1952 |